Patented Apr. 13, 1937

2,077,005

UNITED STATES PATENT OFFICE 2,077,005

PRODUCTION OF SULPHATE ESTERS OF 2-BUTYLOCTANOL

Granville A. Perkins and Walter J. Toussaint, South Charleston, W. Va., assignors, by mesne assignments, to Union Carbide and Carbon Corporation, a corporation of New York No Drawing. Application February 14, 1934, Serial No. 711,220

13 Claims. (Cl. 260—99.12)

This invention relates to the production of sulphuric acid esters and derivatives of saturated, branched-chain alcohols of high molecular weight, which possess important physical properties adapting them for a wide variety of uses as detergents, wetting, foaming and dispersion agents in treatment liquors employed in the textile, leather, and other industries.

More especially the invention concerns the production of butyloctyl acid sulphate and various salts and derivatives thereof, as well as certain intermediate products including 2-butyloctanol.

The new 2-butyloctyl acid sulphate apparently has the following formula:

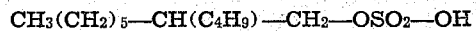

It may be prepared by the sulphation of 2-butyloctanol—1, $CH_3(CH_2)_5—CH(C_4H_9)—CH_2—OH$, in manner hereinafter described. The resultant product may be converted by a suitable compound, such as caustic alkali, to the corresponding salt of the butyloctyl acid sulphate:

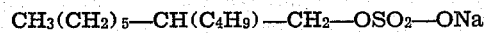

The 2-n butyloctanol-1 which boils at 132° to 133° C. at 12 mm. pressure, and which has a sp. gr. of .834 at 20° C., may be prepared by the condensation of n-hexanol with sodium, as indicated by the following example:

4374 grams of n-hexanol were heated with 394 grams sodium at 230° to 290° C. for about three hours under superatmospheric pressure in a bomb. The reaction products were treated with methanol to destroy any unreacted sodium. Water was gradually added; and the oil was washed several times with water, and then fractionally distilled with an excess of water, and the excess hexanol removed.

The residue boiling above about 80° C. at 1 mm. pressure was further fractionated at 12 mm. absolute pressure. The cut distilling at 132° to 133° C. contained the 2-butyloctanol. This procedure produces the 2-n butyloctanol-1.

The butyloctanol may be prepared by other methods than that recited,—such as by the appropriate treatment of butylhexylmalonic acid, or by the hydrogenation of butylamylacrolein in the liquid or vapor phase, preferably under superatmospheric pressure and in the presence of a hydrogenating catalyst.

By substituting for the n-hexanol other straight chain oxygen-containing compounds such as n-heptanol, or n-octanol, corresponding condensation products in the nature of branched chain higher aliphatic alcohols adapted for the production of detergents and the like can be produced.

The following will exemplify the process for the production from 2-butyloctanol of the new butyloctyl acid sulphates, and of the neutral salts thereof.

To a liquid mixture of 9.3 grams (.05 mol.) of butyloctanol and 130 c. c. carbon tetrachloride, dried in a current of dry nitrogen, were gradually added 6.3 grams (.055 mol) of chlorsulphonic acid with vigorous agitation during fifteen minutes,—the temperature being maintained at around −20° C. Temperatures up to +20° C. may be used if a mutual solvent for the reactants such as beta-beta'-dichlorethyl ether is employed instead of carbon tetrachloride. The mixture was reacted for 1.5 hours under these conditions, after which the resultant reaction mixture was neutralized with a cold 5% methanolic solution of caustic soda,—yielding a water-white solution. (An aqueous solution of the alkali may be substituted for the methanolic solution.) The solvents were then driven off under subatmospheric pressure on a steam bath, and the residue evaporated to dryness.

The dry neutral butyloctyl sulphate may be purified in various ways, as by dissolving it in methanol, filtering the mass to remove inorganic salts, and again evaporating to dryness the filtrate containing the sodium butyloctyl sulphate. The neutral sulphate is water-soluble, and can thus be separated from any unchanged butyloctanol, which is water-insoluble.

Very good results are obtained in the above-described method when employing around a 15% excess of the chlorsulphonic acid over the equivalent of the butyloctanol used.

Filtration of the reaction product for removal therefrom of the inorganic salts, before distilling off the solvent, yields a somewhat softer, pale yellow product than where the filtration step follows the evaporation to dryness of the reaction mixture.

The sodium butyloctyl sulphate produced in the practice of the invention is a waxy-white solid, soluble in water, methanol, ethanol, isopropanol, butanol, benzene, hexane, butane, ethyl ether, isopropyl ether, and in acetone and other ketones.

Its aqueous solutions are strongly detergent, and are not noticeably decomposed by dilute acids and alkalies. Treatment with a strong acid of a concentrated solution of the sodium butyloctyl sulphate will set free the butyloctyl acid sulphate,—which is an oil, relatively insoluble in water; and boiling the sulphate with moderately strong mineral acid will very gradually hydrolyze the same to butyloctanol and sulphuric acid.

Other methods for the sulphation of the 2-butyloctanol-1 may be utilized. For instance, the 2-butyloctanol may be reacted with twice the theoretical amount of 90% to 100% sulphuric acid, at a temperature of about 35° C.,—the mixture being constantly agitated for a period of two hours. The reaction mixture separates into two layers upon standing, one containing the sulphuric acid, and the other the butyloctyl acid sulphate. Upon pouring the mixture on ice in water, the sulphuric acid dissolves in the water, and the butyloctyl acid sulphate floats on top of the water in the form of an oily liquid that is relatively insoluble in water but is soluble in ethyl ether, ethyl alcohol, and many other organic solvents. It possesses acid properties, since only one of the hydrogen atoms of the sulphuric acid has been replaced with an alkyl group.

The butyloctyl acid sulphate and the corresponding neutral sodium butyloctyl sulphate are admirably adapted for a wide variety of uses in the textile and other industries, such as wool washing liquors, and dyeing baths prepared from hard waters containing lime and magnesium salts, because of the fact that their corresponding magnesium and calcium salts are water-soluble.

It is within the scope of the invention to produce not only sodium and potassium butyloctyl sulphates but similar compounds prepared by employing in the neutralization of the acid sulphates, other bases, such as those of the other alkalies, and the alkaline earths; organic bases; or compounds compatible with fixed alkalies and which may exist in dissolved form in a caustic alkali solution,—such as aluminum oxide.

The invention is susceptible of modification within the scope of the appended claims.

We claim:

1. As a chemical compound, the acid sulphate ester of 2-n butyloctanol-1, the same being an oily liquid having acid properties and being sparingly soluble in water, but soluble in ethyl ether and ethyl alcohol.

2. A chemical compound in the form of an oily liquid, relatively insoluble in water, but soluble in ethyl ether and ethyl alcohol, the said compound being a sulphate ester of 2-n butyloctanol-1 and having the apparent formula:

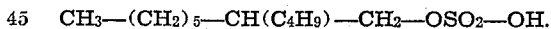

$$CH_3—(CH_2)_5—CH(C_4H_9)—CH_2—OSO_2—OH.$$

3. A chemical compound in the form of a waxy solid, soluble in water and organic solvents, and resistant to dilute acids and alkalies in aqueous solution, the said compound being a salt of the sulphate ester of 2-n butyloctanol-1, and having the apparent formula:

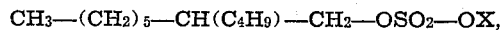

$$CH_3—(CH_2)_5—CH(C_4H_9)—CH_2—OSO_2—OX,$$

where X represents an alkali or alkaline earth metal whose aqueous solution is compatible with an alkali.

4. As a chemical compound, a neutral salt of the sulphate ester of 2-n butyloctanol-1, the same being a waxy solid, soluble in water and organic solvents, and whose water solutions are not noticeably affected by dilute acids and alkalies.

5. As a detergent, an alkali metal salt of the sulphate ester of 2-n butyloctanol-1, the same being a waxy solid, soluble in water and organic solvents, and whose water solutions are not affected by dilute acids and alkalies nor by compounds normally imparting hardness to the water.

6. In the process of preparing a detergent from n-hexanol, the steps which comprise condensing n-hexanol in the presence of an alkali metal, fractionally distilling the resultant reaction product, separately recovering the fraction distilling at 132° to 133° C. at 12 mm. pressure, and sulphating the latter at a temperature below around 10° C.

7. The process of producing a butyloctyl sulphate adapted for use as a detergent, which comprises sulphating a 2-butyloctanol-1 at low temperature while restricting the formation of complete sulphonation products, neutralizing the resultant reaction mixture with an alkaline compound, removing the inorganic salts present in the mixture, and recovering the resultant neutral butyloctyl sulphate.

8. The process of producing a butyloctanol sulphate adapted for use as a detergent, which comprises sulphating 2-n butyloctanol-1 at low subatmospheric temperature while restricting the formation of true sulphonic acids, neutralizing the resultant reaction mixture with a caustic alkali, eliminating the inorganic salts present in the mixture, and recovering the resultant neutral butyloctyl sulphate.

9. The process of producing a butyloctanol sulphate adapted for use as a detergent, which comprises sulphating a 2-butyloctanol-1 at low subatmospheric temperature while restricting the formation of true sulphonic acids, neutralizing the resultant reaction mixture with an alcoholic solution of an alkali, eliminating the inorganic salts present in the mixture, and recovering the resultant neutral butyloctyl sulphate.

10. In the process of preparing a detergent from 2-butyloctanol-1, the step of reacting upon a dry 2-butyloctanol-1 with an excess of chlorsulphonic acid at a low temperature in the presence of a dry volatile solvent.

11. In the process of preparing a detergent from 2-n butyloctanol-1, the steps which comprise reacting upon a dry 2-n butyloctanol-1 with an excess of chlorsulphonic acid at a low temperature while retarding the formation of true sulphonic acids, neutralizing in the cold the resultant reaction mixture with a dilute alcoholic solution of an alkaline compound, evaporating the neutralized mixture to dryness, thereby distilling off the solvents and water, and recovering the detergent neutral butyloctyl sulphate as a residue.

12. In the process of preparing a detergent from 2-butyloctanol-1, the steps which comprise reacting upon dry 2-butyloctanol-1 with an excess of chlorsulphonic acid at a low temperature while retarding the formation of true sulphonic acids, neutralizing in the cold the resultant reaction mixture with a dilute alcoholic solution of an alkaline compound, evaporating the neutralized mixture to dryness, thereby distilling off the solvents and water, recovering the detergent neutral butyloctyl sulphate as a residue, and filtering inorganic salts from the reaction product prior to the distilling therefrom of the said solvents.

13. In the process of preparing a detergent from 2-butyloctanol-1, the steps which comprise reacting upon dry 2-n butyloctanol-1 with an excess of chlorsulphonic acid at a low temperature while retarding the formation of true sulphonic acids, neutralizing in the cold the resultant reaction mixture with a dilute alcoholic solution of an alkaline compound, evaporating the neutralized mixture to dryness, thereby distilling off the solvents and water, redissolving the residue in an organic solvent, filtering off inorganic salts present therein, evaporating the solution to dryness, and recovering the detergent neutral butyloctyl sulphate as a residue.

GRANVILLE A. PERKINS.
WALTER J. TOUSSAINT.